May 23, 1950 G. H. OSBON ET AL 2,508,769
ADJUSTABLE BOAT SEAT

Filed Aug. 19, 1948 2 Sheets-Sheet 1

INVENTOR
GEORGE H. OSBON
WILLIAM A. SANDMAN
By Linrance and
Van Antwerp
ATTORNEYS

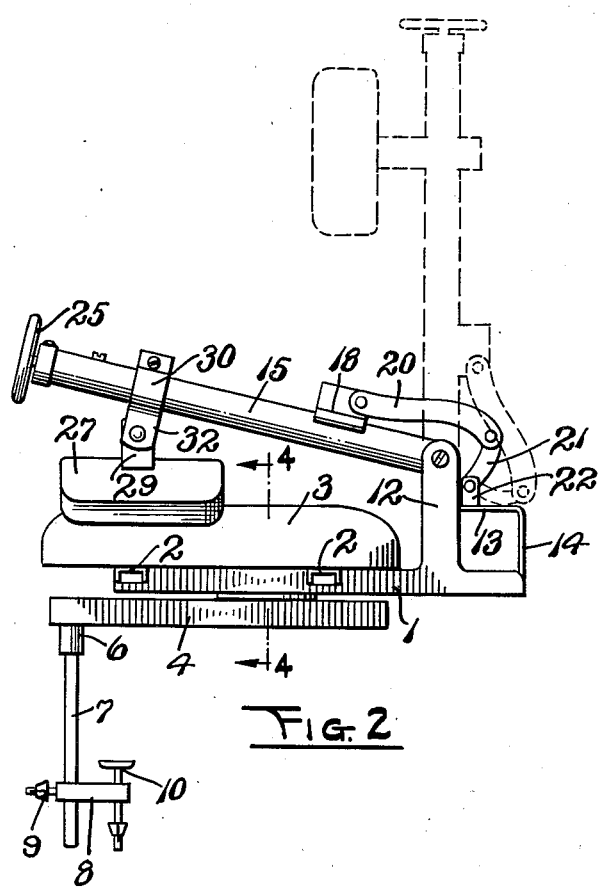
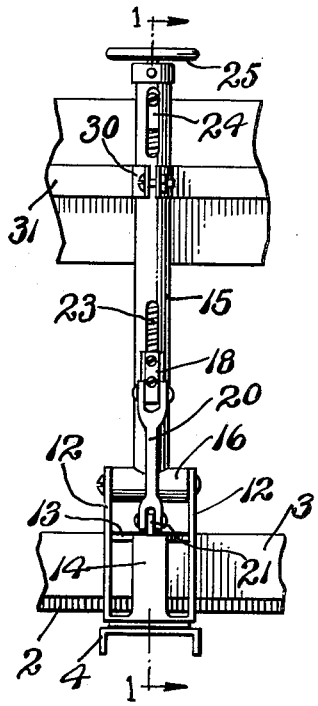
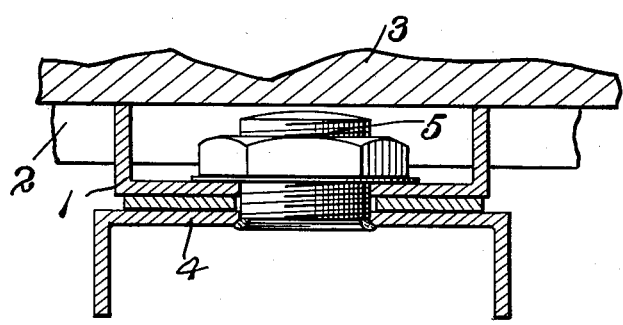
FIG. 2.
FIG. 3.
FIG. 4.
INVENTOR.
GEORGE H. OSBON
WILLIAM A. SANDMAN
ATTORNEYS Patented May 23, 1950

2,508,769

UNITED STATES PATENT OFFICE 2,508,769

ADJUSTABLE BOAT SEAT

George H. Osbon and William A. Sandman, Sturgis, Mich.

Application August 19, 1948, Serial No. 45,154

7 Claims. (Cl. 155—133)

1

This invention relates to an adjustable seat which is particularly useful in connection with boats, but may be used in other places. It is an object and purpose of the present invention to provide a seat which may be connected, for example, to a cross-board in a boat, said board ordinarily being used by occupants of the boat to sit upon, the seat of our invention having a construction whereby it can be swung about a vertical axis to different positions, and also having a supporting backrest which is yieldable to pressure thereagainst. The seat, when used in boats or on docks or wharves, or in many other places, is designed for the comfort of the user and for ready change of position when desired.

An understanding of the invention may be had from the following description, taken in connection with the accompanying drawings, in which:

Fig. 2 is an elevation of the adjustable seat of our invention with the back folded to occupy less space.

Fig. 3 is a rear elevation with parts fragmentarily disclosed, and

Fig. 4 is a vertical section enlarged, substantially on the plane of line 4—4 of Fig. 2.

Like reference characters refer to like parts in the different figures of the drawings.

Figure 1:
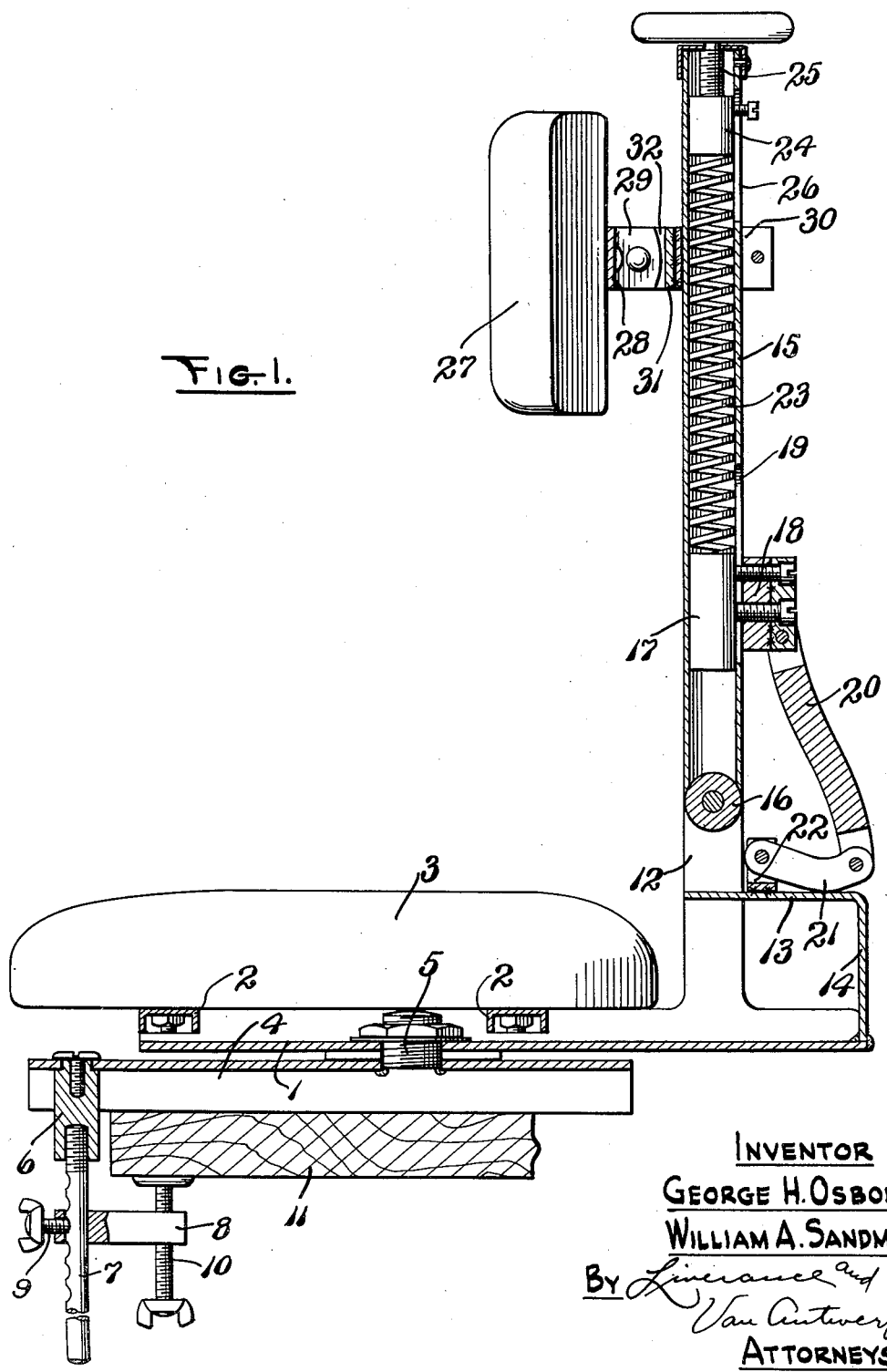
Fig. 1 is a vertical section with parts in side elevation, the section being on the plane of line 1—1 of Fig. 3.

In the construction which is shown in the drawings, a horizontal bar 1 preferably of channel form, has two, spaced-apart channel bars 2 located transversely thereof permanently welded or otherwise connected with the bar 1. The seat 3 which may be of conventional upholstered form, is located above the bars 2, and securely fastened thereto. The bar 1 has its spaced flanges extending upwardly, while the bars 2 have the flanges thereof extending downwardly, and are located in the recesses cut in the flanges of the bar 1.

Below the bar 1, is an additional channel bar 4, generally parallel to bar 1, with downwardly extending flanges, the two webs of the channels 1 and 4 being connected by a threaded stud 5 on which a nut is screwed. The stud 5 is welded to the web of channel bar 4, and the upper channel bar 1 and the parts connected therewith may be turned about the vertical axis of the stud.

2

At the forward end of the bar 4, is a downwardly extending block 6, in the lower end portion of which a rod 7 may be threaded as shown in Fig. 1. A short, solid, horizontal bar 8 has an opening near one end through which the rod 7 passes. The bar 8 may be adjusted to different positions in the length of the rod 7 and releaseably secured in any selected position by the thumb screw 9 as shown at the inner or rear-end portion of the bar 8. A screw clamp 10 passes therethrough vertically so that by locating bar 4 at the upper side of a horizontal board seat 11 of a boat, the screw 10 may be clamped against the underside for securely holding the seat in fixed position on the board. Of course, the wide adjustability of the position of the clamp on the rod 7 permits a securing to many other kinds of supports of greater thickness than the board shown at 11.

The first described channel bar 1 extends a distance back of the seat 3. From each of its spaced-apart side flanges, vertical arms 12 of metal extend upwardly. The arms 12 may be integral with the flanges of the channel bar 1 or permanently welded to them. Between the upper and lower ends of the arms 12, a horizontal metal plate 13 extends across and is welded or otherwise secured to the arms 12, extending rearwardly for a distance and then being turned downward in a vertical leg 14 which reaches the web of bar 1, and is welded thereto.

A hollow tubular standard 15 at its lower end is provided with a horizontal cross head 16 located between the upper ends of the arms 12, and rockably mounted on said arms for swinging movement forward and backward. A cylindrical member 17 is slidably mounted within the lower portion of the standard 15 and is connected with a block 18 at the rear of the standard by means of such screws which pass through a vertical slot 19 in the rear side of the standard as shown. A link 20 is pivotally connected at its upper end to the block 18 and at its lower end to a second link 21, which is located in a generally horizontal position, and has a pivotal connection at its front end to brackets 22 welded to the plate 13 and extending upwardly therefrom. The link 21 bent between its ends as shown, normally bear at the lower edge of the bend of the link against the upper side of the plate 13.

A strong coiled compression spring 23 is housed within the tubular standard 15 with its lower end against the upper end of the member 17. The cylindrical interiorly treated sleeve 24 within the standard bears at its lower end against the upper end of the spring. A screw 25 operated by a hand wheel at the upper end of the standard adjusts the sleeve 24 vertically to vary the compression force of the spring 23. The sleeve 24 is held against rotation by a screw passing through a second vertical slot 26 in the rear of the upper portion of the tubular standard 15.

A back rest 27 is mounted at the front of the standard. At its rear side a flat bar 28 is permanently secured having rearwardly turned ends 29, one at each end of the bar. A clamp 30 embraces standard 15 and may be tightened or loosened by the clamping bolt best shown in Fig. 3 for vertical adjustment on the standard. At its forward side, a second bar 31 has a welded connection to the clamp, being located directly back of the bar 28, and having an ear 32 at each end extending forwardly, overlapping the ears 29 to which they are pivotally connected. Thus the back-rest 27 may be rocked about the horizontal axis of the pivots.

The seat structure may be secured to a suitable support as an example, the cross-board in a boat, and has a wide range of attachment adjustability to supports of different thicknesses. The entire seat structure above the bar 4 may be swung about the pivotal axis of the stud 5, and the back-rest may be yieldingly moved back and forth about the pivotal connection of the tubular standard 15 to the arms 12. The spring 23 normally holds the back in a substantially vertical position, as in Fig. 1, with the bend in the link 21 pressing against the upper side of the plate 13. On pressure of the occupant of the seat against the back rest 21, spring 23 is compressed and the member 17 moved vertically in the standard 15. Upon release of pressure, the back-rest is moved forward by the spring 23, at all times snugly engaging the back of the seat occupant. The spring 23 is adjustable as to strength to provide the best conditions of use.

The structure described is very practical and useful, and in its operation has proved wholly satisfactory for the purposes for which it is designed. Such seat structure is readily manufactured at relatively low cost.

The invention is defined in the appended claims, and is to be considered comprehensive of all forms of structure coming within their scope.

We claim:

1. In a structure as described, a horizontal bar, a horizontal seat member mounted on and above said bar, said bar extending to the rear of the seat member, vertical supporting means at the rear portion of the bar back of the seat, a tubular standard pivotally mounted at its lower end on said vertical supporting means, a coiled spring within said standard, a back rest mounted on said standard and located at the front of the upper portion thereof, a block within said standard against which the lower end of the spring bears, means in the upper end of the standard against which the upper end of the spring bears, a member at the rear side of the standard opposite the block therein, connections between said member and block, said standard having a vertical slot through which said connections pass, a link pivotally connected at its upper end to said member extending downwardly and to the rear therefrom, a second link pivotally connected to the lower end of the first link, a horizontal member connected with said vertical supporting means and extending back thereof and means for pivotally connecting the second link at its other end to said horizontal member, said second link being located in a generally horizontal position and adapted to bear at its under side against said horizontal member.

2. A structure as defined in claim 1, said means for pivotally connecting the second link to said horizontal member comprising, a bracket secured to the horizontal member and extending upwardly therefrom to which said second link has pivotal connection, said link extending rearwardly therefrom, and at its rear end portion, upwardly and to the rear to pivotally connect with the lower end of the first link.

3. A structure as defined in claim 1 combined with a second horizontal bar located underneath the first horizontal bar and extending at its front end a distance in front of the front end of the first bar, and means for pivotally connecting the first bar to said second bar for turning movement about a vertical axis.

4. A structure as defined in claim 1, said means at the upper end of the tubular standard against which the spring therein bears at its upper end comprising, an interiorly threaded nut, a screw entering said nut at the upper end thereof, and hand engageable means at the upper end of the screw for turning it to vertically adjust said nut.

5. In a structure as described, a horizontal bar, transverse horizontal bars spaced from each other over and connected to said horizontal bar, a seat member secured to the transverse bars, said first mentioned horizontal bar extending back of the rear side of the seat member, vertical arms connected one at each side of and to said first horizontal bar back of the seat member and extending above it, a tubular, generally vertical standard, a horizontal cross head at the lower end of the standard lying between and having a pivotal connection adjacent the upper ends of said arms, a coiled spring within the standard, a block within the standard against which the lower end of the coiled spring bears, means in the upper end of the standard against which the upper end of the spring bears, a member comprising a horizontal plate extending between said arms and permanently secured thereto between their upper and lower ends, said plate extending back of said arms said plate having a portion turned downwardly to the rear end of the first mentioned horizontal bar, a link pivotally connected at its front end to said plate and extending rearwardly, a second link pivotally connected at its lower end to the rear end of the first link extending upwardly and forwardly to the said standard, a member at the outer side of the standard to which the upper end of said second link has pivotal connection, means connecting said member to the block within the standard against which the spring bears, said standard having a vertical slot through which said connecting means passes, and a back rest adjustably mounted on said standard at the upper portion thereof located at the front of the standard over the rear portion of the seat member.

6. A structure as defined in claim 5, said back rest having a bar secured to the rear side thereof and located substantially horizontal, said bar having rearwardly turning ears, one at each end, a releasable clamp around the standard, a second generally horizontal bar secured at its middle portion to said clamp and located generally parallel to the bar attached to the back rest, said second bar having an outwardly extending ear at each end, and means pivotally connecting the ears of said last mentioned bars together.

7. In a structure as described, a horizontal bar, a vertical support connected to the bar and extending above it at its rear end portion, a seat member secured at the upper side of the bar in front of the vertical support, a second horizontal bar underneath the first bar, means pivotally connecting said bars together for the first bar to turn about a vertical axis, a clamp secured at the front end of the second bar below it, including a screw actuated clamp member movable toward or away from said second bar, a vertical standard pivotally mounted to turn about a horizontal axis on said vertical support, said standard extending above the support, a back rest mounted at the upper portion of said standard and located in front thereof, and yielding means operatively associated with said standard and said support yieldingly resisting pivotal movement of the said standard to the rear.

GEORGE H. OSBON.
WILLIAM A. SANDMAN.

REFERENCES CITED

The following references are of record in the file of this patent:

UNITED STATES PATENTS

| Number | Name | Date |
|---|---|---|
| 2,484,454 | Heifner | Oct. 11, 1949 |